United States Patent [19]

Berger

[11] 4,097,465
[45] Jun. 27, 1978

[54] LIQUID COATING COMPOSITIONS
[75] Inventor: Dieter Berger, Marl, Germany
[73] Assignee: Chemische Werke Huels Aktiengesellschaft, Marl, Germany
[21] Appl. No.: 686,484
[22] Filed: May 14, 1976
[30] Foreign Application Priority Data
May 17, 1975 Germany .............................. 2522045
[51] Int. Cl.$^2$ ............................................. C08G 63/12
[52] U.S. Cl. .............................. 260/75 EP; 260/78.41; 260/835
[58] Field of Search ........................ 260/75 EP, 78.41
[56] References Cited
U.S. PATENT DOCUMENTS

| | | | |
|---|---|---|---|
| 3,862,093 | 1/1975 | Jellinek et al. | 260/75 EP |
| 3,912,690 | 10/1975 | Yapp | 260/75 EP |
| 3,979,477 | 9/1976 | Schmid et al. | 260/835 |
| 3,989,767 | 11/1976 | Homma et al. | 260/834 |

Primary Examiner—Lucille M. Phynes
Attorney, Agent, or Firm—Millen & White

[57] ABSTRACT

Liquid varnish coating compositions having a low or nil solvent content, comprising a mixture of binders and optionally conventional auxiliary agents, which contain, as the binder, a mixture of:

A) glycidyl esters produced in the usual manner by the reaction of esterification products containing carboxyl groups with an excess of a 2,3-epoxyhaloalkane in the presence of reactive agents which split off hydrogen halide; and B) one or more cyclic anhydrides of saturated and/or unsaturated aliphatic and/or cycloaliphatic dicarboxylic acids, or mixtures consisting essentially of carboxylic acid anhydrides of saturated and/or unsaturated aliphatic and/or cycloaliphatic and aromatic dicarboxylic acids, wherein the melting point of the anhydride or anhydride mixture is below 100° C., in such an amount that 0.7–1.5 anhydride equivalents are present for one epoxide equivalent of the glycidyl esters.

11 Claims, No Drawings

LIQUID COATING COMPOSITIONS

CROSS-REFERENCE TO RELATED PATENT APPLICATION

This application is related in subject matter to that of copending, commonly assigned U.S. patent application Ser. No. 686,483, filed May 14, 1976, the contents of which are incorporated by reference herein.

BACKGROUND OF THE INVENTION

This invention relates to liquid varnish coating compositions having a low or nil solvent content in which the binder comprises a glycidyl ester and at least one cyclic anhydride of a dicarboxylic acid.

Binders for varnishes on a low-solvent or solvent-free basis are required to an increasing extent for ecological reasons and due to a growing scarcity of raw materials. The ecologically harmless varnishes prepared therefrom contain no quantities, or only low amounts, of readily volatile compounds such as solvents which enter the atmosphere during the curing of the varnishes, and they do not split off any volatile products during the curing reaction. Accordingly, such varnishes must be cured in an additive reaction. With the heretofore predominant use of conventional varnishes with a high solvent content, the recovery of the solvents was generally impossible, which became more and more uneconomical with an increase in the scarcity of raw materials. Rather, the solvents and volatile splitting products either entered the atmosphere or had to be eliminated for ecological reasons in expensive afterburning plants. Due to the constant danger of fire and explosion, the handling of solvents and conventional varnishes requires expensive safety measures during the manufacture and curing thereof. Furthermore, due to blister formation and solvent retention on account of the volatile substances, it has been impossible to produce thick-coat varnish layers of above 100 $\mu$ in one operating step, as is frequently desirable for economical reasons.

Another desired feature to be displayed by these coating compositions is that they yield coatings having excellent mechanical properties, excellent weathering stability and good protection against corrosion.

Low-solvent coating compositions with satisfactory properties could be produced heretofore by using OH-group-containing polyesters and aminoplasts or the low-molecular weight precursors thereof, e.g. hexamethoxymethylmelamine. However, during the condensative curing reaction, alcohols and formaldehyde are liberated as cleavage products. Thick-layer coatings from this binder can thus only be provided in an expensive procedure by the application and curing of several layers; however, the adhesion between the individual layers is frequently unsatisfactory.

Powder varnishes have been known heretofore as ecologically favorable varnishes. However, the preparation of varnishes using a solid binder requires special and complicated processes which can be effected by varnish manufacturers only in exceptional cases. Furthermore, the powdered varnishes can be utilized only with the aid of special coating systems, e.g. a fluidized-bed coating procedure, EPS (Electrostatic powder coating) process, etc. Also, the provision of correct color nuances in the varnish producer's plant, as well as the change in color hue and the running of the paint (orange peel effect) when applied by the varnish consumer, cause practical difficulties.

The powdery varnish binders which have been known for the longest time, namely the solid reaction products of 2,2-bis-(4-hydroxyphenyl)propane (bisphenol A) and epichlorohydrin, show only minor weathering resistance. In more recent times, powder varnish binders having an improved weatherability were developed on the basis of polyesters and polyacrylates. Since blocked isocyanates or aminoplasts are required as curing materials in these cases, blocking agents or cleavage products are liberated during the curing reaction as harmful substances.

Weatherable coatings of good quality can also be produced, as is known, on the basis of polyesters and aliphatic or cycloaliphatic polyisocyanates. When using special polyesters and low-molecular weight polyisocyanates, it is also possible to prepare low-solvent content varnishes on this basis. However, widespread use of such varnishes is impeded due to the adverse physiological properties of the low-molecular weight isocyanates. Coatings on the basis of polyesters and modified higher-molecular weight polyisocyanates, in turn, can be utilized only with larger amounts of solvent. Low-solvent content varnishes of low-molecular weight, liquid bisphenol A-bis-epoxides and polyamines as the curing agents are likewise known, but yield only films having poor mechanical characteristics. Weatherable coatings, i.e. those which do not tend toward yellowing and chalking, cannot presently be obtained with bisphenol A-bis-epoxides. The widely popular curing in the casting resin sector of polyepoxides such as bisphenol-A-epoxides, bisglycidyl esters of dicarboxylic acids and so-called olefin epoxides with anhydrides has not gained any significance for varnishes and coatings (cf. H. Kittel, "Lehrbuch der Lacke und Beschichtungen" (Textbook of Varnishes and Coatings), vol. I, part 2, p. 632, publishers W. A. Colomb in Hennemann GmbH, Berlin-Oberschwandorf, 1973).

Furthermore known are glycidyl esters of 2–6 epoxide equivalents per mole which have been prepared from low-molecular weight partial esters, carrying carboxyl groups, by reaction with epichlorohydrin; e.g. see German Pat. No. 1,165,030; DOS (German Unexamined Laid-Open Application) No. 1,816,933; DOS Nos. 1,916,287; 1,643,789; British Pat. Nos. 884,033; and 1,026,141. These acidic partial esters are obtained by esterifying one mole of a polyalcohol or polyether dialcohol (cf. German Pat. No. 1,904,110), with 2–6 hydroxy groups, and 2–6 moles of an aromatic, cycloaliphatic or aliphatic dicarboxylic acid and/or the anhydrides thereof; during this process, the hydroxy groups are partially or completely esterified. It is known from DOS No. 1,643,789 that molded articles obtained by curing polyglycidyl esters of the partial esters of polyalcohols and aliphatic dicarboxylic acids with anhydrides show poor mechanical properties. It is likewise known from DOS 1,643,789 that molded articles with good, in part also very good, mechanical properties are produced by curing glycidyl esters of the partial esters of polyalcohols and aromatic or especially cycloaliphatic dicarboxylic acids (hexahydrophthalic acid, $\Delta^4$-tetrahydrophthalic acid and the methyl homologs thereof) with hexahydrophthalic anhydride. These good mechanical properties in compact molded articles, however, do not carry over to thin layers and coatings on substrates wherein such glycidyl esters yield coatings of insufficient elasticity.

OBJECTS OF THE INVENTION

Accordingly, it is a general object of this invention to provide improved liquid varnish coating compositions having a low or nil solvent content.

Another object of this invention is to provide varnish coatings which simultaneously exhibit good mechanical properties, high weather resistance and good corrosion protection.

A further object of this invention is to provide liquid varnish coating compositions having a solvent content of only about 0–20% by weight which can be processed by conventional means with minimal emission of solvents into the atmosphere.

An additional object of this invention is to provide an improved binder for liquid varnish coating compositions.

Upon study of the specification and appended claims, further objects and advantages of this invention will become apparent to those skilled in the art.

SUMMARY OF THE INVENTION

Briefly, the above and other objects, features and advantages of the present invention are attained in one aspect thereof by employing, in a liquid varnish coating composition having a 0–20% solvent content and comprising a mixture of a binder and optionally conventional auxiliary agents, as the binder, a mixture of:

(a) glycidyl esters produced in the usual manner by the reaction of esterification products containing carboxyl groups with an excess of a 2,3-epoxyhaloalkane in the presence of reactive agents which split off hydrogen halide; and (b) cyclic anhydrides of saturated and/or unsaturated aliphatic and/or cycloaliphatic dicarboxylic acids, or mixtures consisting essentially of carboxylic acid anhydrides of saturated and/or unsaturated aliphatic and/or cycloaliphatic and aromatic dicarboxylic acids, wherein the melting point of the anhydrides and/or anhydride mixtures is below 100° C., in such an amount that 0.7–1.5 anhydride equivalents are present for one epoxide equivalent of the glycidyl esters by using in component (A) glycidyl esters containing 1.5–2.5 epoxide equivalents/mole and having epoxy numbers of 0.2–0.4 epoxide equivalents/100 g., OH-numbers of 20–130 mg. KOH/g., and average molecular weights of 450–800; and by producing same by the glycidylation of esterification products containing carboxyl groups and having acid numbers of 220–350 mg. KOH/g., OH-numbers of 0–100 mg. KOH/g., average molecular weights of 350–600, and a degree of polymerization (= average number of monomer building blocks in a polyester molecule) of 2.8–3.5, wherein the esterification products containing carboxyl groups are obtained by a condensation of mixtures I and III, wherein mixture I consists of:

I. (a) 0–50 molar percent of one or more aliphatic polyols with 3 or 4 hydroxy groups and 3–6 carbon atoms and I. (b) Correspondingly 100–50 molar percent of a mixture II of aliphatic and/or cycloaliphatic diols, wherein the hydroxy functions are separated by 2–12 carbon atoms and optionally up to 2 of the carbon atoms can be substituted by oxygen atoms which latter, in turn are separated by at least 2 carbon atoms from each other and from the hydroxy groups, wherein optionally the mixture II can also consist of a single aliphatic or cycloaliphatic diol meeting the above definition, and wherein mixture II consists of:

III. (a) 15–50 molar percent of one or more saturated aliphatic dicarboxylic acids of 4–12 carbon atoms and/or the intramolecular anhydrides thereof and III. (b) 85–50 molar percent of one or more aromatic and/or cycloaliphatic dicarboxylic acids with 6 to 12 carbon atoms, preferably 6 carbon atoms, in the ring-system wherein the carboxyl groups are arranged in the 1,2-, 1,3- or 1,4-position — except for terephthalic acid — and/or optionally the cyclic anhydrides thereof wherein optionally up to 30 molar percent of these dicarboxylic acids can be sustituted by an aromatic polycarboxylic acid with more than 2 carboxyl groups, optionally in the form of the intramolecular anhydride thereof.

DETAILED DISCUSSION

The present invention provides novel binders, with which solvent-free or low-solvent content liquid varnishes can be prepared which can be processed without emission, or almost free from emission, to coatings having simultaneously good mechanical properties, a very high weathering resistance and good corrosion protection.

This problem is solved, in accordance with the present invention, by using as component (A) glycidyl esters containing 1.5–2.5 epoxide equivalents/mole and having epoxy numbers of 0.2–0.4 epoxide equivalents/100 g., OH-numbers of 20–130 mg. KOH/g., and average molecular weights of 450–800; and by producing same by the glycidylation of esterification products containing carboxyl groups and having acid numbers of 220–350 mg. KOH/g., OH-numbers of 0–100 mg. KOH/g., average molecular weights of 350–600, and a degree of polymerization (= average number of monomer building blocks in a polyester molecule) of 2.8–3.5 wherein the esterification products containing carboxyl groups have been obtained by a condensation of mixtures I and III, wherein mixture I consists of:

I. (a) 0–50 molar percent of one or more aliphatic polyols with 3 and 4 hydroxy groups and 3–6 carbon atoms and I. (b) Correspondingly 100–50 molar percent of a mixture II of aliphatic and/or cycloaliphatic diols, wherein the hydroxy functions are separated by 2–12 carbon atoms and optionally up to 2 of the carbon atoms can be substituted by oxygen atoms which latter, in turn are separated by at least 2 carbon atoms from each other and from the hydroxy groups, wherein optionally the mixture II can also consist of a single aliphatic or cycloaliphatic diol meeting the above definition, and mixture III consists of III. (a) 15–50 molar percent of one or more saturated aliphatic dicarboxylic acids of 4–12 carbon atoms and/or the intramolecular anhydrides thereof and III. (b) 85–50 molar percent of one or more aromatic and/or cycloaliphatic dicarboxylic acids with 6 to 12 carbon atoms, preferably 6 carbon atoms, in the ring-system wherein the carboxyl groups are arranged in the 1,2-, 1,3- or 1,4-position — except for terephthalic acid — and/or optionally the cyclic anhydrides thereof wherein optionally up to 30 molar percent of these dicarboxylic acids can be substituted by an aromatic polycarboxylic acid with more than 2 carboxyl groups, optionally in the form of the intramolecular anhydride thereof.

The term low-solvent content means within the scope of the present invention, a coating composition containing not more than 20% by weight of solvent, preferably less than 15%, and especially 3–10%.

The glycidyl esters of this invention can be prepared by conventionally reacting esters carrying carboxyl groups, produced from mixtures I and III and denoted hereinbelow as acidic esters, in one or several stages with a 2,3-epoxyhaloalkane while splitting off hydrogen halide. Primarily for economical reasons, the use of epichlorohydrin and/or β-methylepichlorohydrin is preferred.

The procedure can be conducted so that the alkali salts of the acidic esters are reacted at an elevated temperature with an excess of epichlorohydrin and/or β-methylepichlorohydrin, the reaction mixture is filtered off from the alkali chloride, and the excess epichlorohydrin and/or β-methylepichlorohydrin is distilled off, e.g. as described in DOS 1,901,995. However, this process is cumbersome, since the alkali salts of the esters must be separately produced in a preliminary stage and then dried.

Another possibility is to react the ester, in the form of the free acid, in one stage with an excess of eipichlorohydrin to form the glycidyl ester in the presence of catalysts, e.g. tertiary amines, quaternary ammonium salts or anion exchange resins. During this reaction, the corresponding chlorohydrin ester is first obtained which, by reaction with the excess epichlorohydrin, is reepoxidized, forming the glycidyl ester and glycerol dichlorohydrin. The glycerol dichlorohydrin is distilled off with epichlorohydrin after termination of the reaction and can be regenerated to epichlorohydrin by treatment with an alkali. An analogous reaction can be effected with β-methylepichlorohydrin. Such a single-stage process is described in German Pat. No. 1,165,030 and British Pat. No. 884,033. The process has the disadvantage of yielding relatively impure products which, due to rather large proportions of chlorohydrin esters, have a comparatively low epoxy value (i.e. epoxide equivalents per 100 g.) and a high chlorine content.

The glycidyl esters of this invention are preferably produced by directly reacting epichlorohydrin with the acidic esters at 40–125° C. in the presence of 0.001–1% by weight (based on the reaction mixture) of a catalyst, preferably a quaternary ammonium or phosphonium compound or a tertiary sulfonium compound, and treating the thus-formed chlorohydrin ester with agents to split off hydrogen halide, e.g. sodium hydroxide. Since the boiling point of the reaction mixture under normal pressure (about 1000 millibars) is approximately 125° C. maximum, excess pressure would have to be utilized when using higher reaction temperatures, requiring an unnecessarily high expenditure in apparatus. Reaction temperatures which are too low generally result in fine-grained sediments which are difficult to filter (when using sodium hydroxide, these sediments consist of sodium chloride) and which impede working up of the reaction mixture. Larger amounts of catalyst are undesirable, inasmuch as the reaction is not greatly accelerated thereby and an increasing discoloration of the reaction mixture can occur. In place of epichlorohydrin, it is also possible to use β-methylepichlorohydrin.

Suitable catalysts for the addition of epihalohydrin and/or β-methylepihalohydrin and also for splitting off the hydrogen halide include but are not limited to tertiary amines such as triethylamine, tripropylamine, benzyldimethylamine, N,N'-dimethylaniline and triethanolamine; especially quaternary ammonium bases, such as benzyltrimethylammonium hydroxide or choline; quaternary ammonium salts, such as tetramethylammonium chloride, tetraethylammonium bromide and benzyltrimethylammonium chloride; quaternary phosphonium salts, such as tetramethylphosphonium chloride and tetraphenylphosphonium bromide; tertiary sulfonium salts, such as trimethylsulfonium iodide and 2,3-epoxypropylmethylethylsulfonium iodide; and ion exchange resins with tertiary amine or quaternary ammonium groups.

The epichlorohydrin or β-methylepichlorohydrin is used in an excess of 3–20 moles, preferably 5–10 moles, per carboxyl group equivalent of the acidic esters. With the use of less than 3 moles of epichlorohydrin or β-methylepichlorohydrin, glycidyl esters are obtained which are too viscous and are incapable of forming low-solvent content varnishes; the use of more than 20 moles of epichlorohydrin or β-methylepichlorohydrin is uneconomical and furthermore does not result in any appreciable lowering of the resultant glycidyl ester viscosity.

Strong bases are normally utilized for the dehydrohalogenation, such as anhydrous sodium hydroxide or aqueous sodium hydroxide solution, preferably 25–50% by weight sodium hydroxide solution, or also correspondingly other strong bases, such as potassium hydroxide, calcium hydroxide, alkali carbonates or the aqueous solutions thereof. These bases can be added after or during the chlorohydrin formation.

An especially preferred process for the production of the glycidyl esters resides in uniformly adding, during the course of 1–3 hours, 25–50% aqueous sodium hydroxide solution (in a 10–50% excess) to the solution of the ester, boiling under normal pressure in epichlorohydrin and/or β-methylepichlorohydrin containing 0.001–0.1% by weight (based on the reaction mixture) of tetraethylammonium bromide or tetraphenylphosphonium bromide as the catalyst; during this procedure, the water is azeotropically removed from the reaction mixture by the epichlorohydrin or β-methylepichlorohydrin. After removal of the water, the epichlorohydrin or β-methylepichlorohydrin is again uniformly fed to the reaction mixture. It is, of course, also possible to conduct the reaction at lower temperatures and reduced pressure. After the sodium chloride has been filtered off, the solution is treated to remove the catalyst, advantageously with adsorbents enumerated in the Czechoslovakian Pat. No. 119,415 patented Aug. 15, 1966, or of copending, commonly assigned U.S. patent application Ser. No. 563,163, filed Mar. 28, 1975, now abandoned, the contents of which are incorporated by reference herein.

Suitable such adsorbents include but are not limited to silica gel, aluminum oxide, bentonites, montmorilonite, bleaching clay or fuller's earth. The adsorbents can advantageously be added to the reaction mixture directly after termination of the dehydrohalogenation at room temperature. The sodium chloride and the adsorbent are then separated simultaneously by filtration.

By concentration of the solution, the glycidyl esters are generally obtained in yields of 85–100%. The epoxide content is normally between 70 and 90% of theory, and the chlorine content is generally between 0.5 and 2.5% by weight.

The thus-obtained glycidyl esters have, on the average, 1.5–2.5, preferably 1.7–2.1 epoxide equivalents/mole calculated from the epoxy number and the molar mass; epoxy numbers of 0.2–0.4, preferably 0.25–0.36 epoxide equivalents/100 g. determined by titration in chloroform with perchloric acid in the presence of excess tetraethylammonium bromide and glacial acetic acid, indicator crystal violet (= methylrosaniline chloride); OH-numbers of 20–130 mg. KOH/g., preferably 30–80 mg. KOH/g. determined by IR spectroscopy in tetrahydrofuran solution; and molecular weights (number average) of 450–800, preferably 500–700, determined by vapor pressure osmosis in chlorobenzene. With an epoxide content in the glycidyl esters of below 1.5 epoxide equivalents/mole, only slightly cross-linked coatings result during curing with anhydrides, which coatings have only a minor hardness and an unsatisfactory corrosion protection effect, while glycidyl esters with more than 2.5 epoxide equivalents/mole are of an undesirably high viscosity and, when cured with anhydrides, yield coatings of unacceptably low elasticity.

The acidic esters or ester mixtures required for the reaction with 2,3-epoxyhaloalkanes can be obtained according to conventional esterification methods, such as melt condensation or azeotropic condensation, e.g. see Houben-Weyl, "Methoden der organischen Chemie" (Methods of Organic Chemistry), vol. XIV/2, Georg Thieme Publishers, Stuttgart, 1963, wherein the molecular weight and the degree of polymerization of the esters are controlled conventionally by the selection of the monomeric components employed, their molar ratio and the degree of conversion during esterification.

In particular, condensation is conducted in the melt in one stage at temperatures of 130°–250° C., preferably 130°–200° C., wherein the desired degree of conversion is determined by controlling the acid number determined by titration in an aqueous sodium hydroxide solution in acetone solution. In this process, all monomeric components (polyols and polycarboxylic acids) are simultaneously esterified until the desired degree of conversion has been reached.

Examples for melt condensations of several esters are found in DOS's Nos. 1,816,096; 1,643,789; and 2,019,282.

The esters are condensed until acid numbers of 220–350. preferably 250–330 mg. KOH/g. are obtained, with a polymerization degree of 2.8–3.5, preferably 2.9–3.3, and molecular weights (number average) of 350–600, preferably 350–450. The resultant OH-numbers of the esters are 0–100 mg. KOH/g., preferably 10–50 mg. KOH/g. The OH-numbers and molecular weights are determined in the same manner as in case of the glycidyl esters.

A degree of polymerization of more than 3.5 and acid numbers of the esters above 350 mg. KOH/g. lead, in the corresponding glycidyl esters, to an epoxide content of more than 2.5 epoxide equivalents/mole and thus to the above-enumerated disadvantages, whereas if the degree of polymerization is less than 2.8 and the acid numbers of the esters are below 220 mg. KOH/g., glycidylesters result having too low an epoxide content (<1.5 epoxide equivalents/mole). Increases in viscosity are incurred in the corresponding glycidyl esters in case of OH-numbers of above 100 mg. KOH/g., as well as molecular weights of more than 600 in the esters, making it difficult to process same in varnishes with a low-solvent content. In the case of molecular weights above 600, the corresponding glycidyl ester coatings exhibits only a low degree of crosslinking, resulting in a decrease of the coating hardness.

Low condensation temperatures (130°–180° C.) lead to longer condensation times, but have the advantage when acidic esters with a considerable hydroxy group content are condensed that the condensation can be terminated in a reproducible fashion at the desired acid number of the ester by rapid cooling.

Suitable polyols to be utilized according to I. (a) include but are not limited to 1,1,1-trimethylolpropane, 1,1,1-trimethylolethane, 1,2,6-hexanetriol, glycerol and pentaerythritol. The aforementioned polyols are employed in amounts of 0–50 molar percent, preferably 5–50 molar percent and especially 5–40 molar percent. When a greater amount of these polyols is utilized in the process, esters are obtained wherein the glycidylation leads to undesirably high-viscosity glycidyl esters. At least 5 molar percent of these polyols reduces the condensation times and, due to the fact that the hydroxy group content is higher in such cases, can result in an improved adhesion of the corresponding glycidyl ester coatings.

Suitable diols to be used in accordance with I. (b) include but are not limited to ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 2,2,4-trimethyl-1,3-pentanediol, diethylene glycol, triethylene glycol, dipropylene glycol, cis- or trans-1,4-bis(hydroxymethyl)cyclohexane and/or mixtures thereof, ethoxylated hydrogenated bisphenol A, cyclododecanediol, isomer mixtures of bis(hydroxymethyl)tricyclo[5,2,1,-0$^{2,6}$]decane, etc. The above-recited diols are used, in accordance with this invention, in amounts of 100–50 molar percent, preferably 95–50 molar percent, and especially 95–60 molar percent.

Suitable aliphatic dicarboxylic acids according to III.(a) include but are not limited to succinic acid, glutaric acid and/or the anhydrides thereof, adipic acid, sebacic acid and azelaic acid. These dicarboxylic acids are used in quantities of 15–50 molar percent, preferably 15–40 molar percent, in accordance with the present invention. When smaller amounts of these dicarboxylic acids are employed, the corresponding glycidyl esters yield only brittle coatings, while the use of more than 50 molar percent of such dicarboxylic acids results in glycidyl esters, the coatings of which have only a minor hardness and insufficient corrosion protection activity.

Advantageous aromatic and cycloaliphatic dicarboxylic acids according to III.(b) include but are not limited to phthalic acid, isophthalic acid, hexahydrophthalic acid, hexahydroterephthalic acid, $\Delta^4$-tetrahydrophthalic acid, methylhexahydrophthalic acid, endomethylenetetrahydrophthalic acid, methylendomethylenetetrahydrophthalic acid and 1.x-cyclododecanedicarboxylic acid (x = 2-6) as well as aromatic polycarboxylic acids of more than 2 carboxyl groups, e.g. 1,2,4-benzenetricarboxylic acid and 1,2,4,5-benzenetetracarboxylic acid. These carboxylic acids are preferably utilized in the form of their cyclic anhydrides, except for isophthalic acid. The aforementioned dicarboxylic acids are used in an amount of 85–50 molar percent, preferably 85–60 molar percent, wherein up to 30 molar percent can be replaced by an aromatic polycarboxylic acid of more than 2 carboxyl groups. With the use of more than 30 molar percent of these aromatic polycarboxylic acids of more than 2 carboxyl groups, glycidyl esters are obtained of an undesirably high viscosity, the coatings of which, though affording a very good corrosion protection, exhibit only minor elasticity.

Illustrative cyclic anhydrides for curing the glycidyl esters of this invention in accordance with (B) include but are not limited to the presently preferred hexahydrophthalic anhydride, methylendomethylenetetrahydrophthalic anhydride, dodecenylsuccinic anhydride and methylhexahydrophthalic anhydride; liquid anhydride mixtures, e.g. as mentioned in DOS No. 2,229,907; and stabilized liquid anhydride mixtures, e.g. according to DOS No. 2,231,892. The above-mentioned carboxylic acid anhydrides are gemerally added in amounts of 0.7–1.5 anhydride equivalents per epoxide equivalent of the epoxide compounds listed under (A). When curing with less than 0.7 anhydride equivalents, the corresponding coatings show an insufficient corrosion protection due to inadequate cross-linking; when using more than 1.5 anhydride equivalents, coatings are obtained which are too brittle.

The glycidyl esters can also be cured with high-melting carboxylic acid anhydrides, such as, for example, phthalic anhydride. However, in case of low-solvent content varnish recipies there is the danger of crystallization of the anhydride. The curing reaction of the clydicyl esters with anhydrides takes place according to an additive mechanism; thus, no cleavage products are liberated.

If desired, the curing of the glycidyl esters according to this invention with the aforementioned anhydrides can be accelerated by the addition of conventional catalysts in catalytic amounts, e.g. of 0.01–5% by weight, generally 0.1–5% by weight, based on the amount of epoxy resin.

Suitable such catalysts include but are not limited to tertiary amines; quaternary ammonium or phosphonium compounds; phenols; aminophenols, e.g. tris(dimethylamino)phenol; cyclic nitrogen compounds, e.g. imidazole derivatives as 1-alkylimidazoles, 2-alkylimidazoles or their methyl-homolog.

Varnishes can be produced from the binders of this invention by first dispersing pigments and optionally fillers in the glycidyl esters, if desired with the addition of solvents, by means of the processing devices customary in the varnish industry, such as three-roller mills or ball mills, before the curing agent is added in the liquid form. Since the curing reaction takes place only gradually at room temperature, the glycidyl esters can also be directly triturated together with the curing agent, the pigments and optionally other customary varnish adjuvants, e.g. flow agents, wetting agents, antighosting agents, defrothers and, if desired, solvents. These varnishes show only a minor buildup of viscosity and can be processed even after 3-30 days without any further additions of solvents or so-called reactive thinners.

To obtain especially low-viscosity varnishes of a high degree of pigmentation, it is possible to use 3–20% by weight, preferably 3 – 10% by weight, of solvents, based on the total varnish. Such varnishes can be applied with the usual spraying units at room temperature or slightly elevated temperature. The thus-produced varnishes can be considered ecologically acceptable in spite of their small solvent content, since the conventional commercial industrial varnishes at present normally contain 40-60% by weight of solvents.

Suitable solvents include but are not limited to aromatic hydrocarbons, ketones, esters and ethers, as well as mixtures of the aforementioned compounds, as they are generally utilized in varnish formulations. Optionally, the solvents can be replaced partially or entirely by so-called reactive thinners, as they are customarily in the epoxy resin technology so that varnishes containing only up to 10% by weight solvent are obtained which are suitable for the preparation of thick-layer varnish coats in one application. Suitable reactive thinners include but are not limited to the monofunctional thinners, such as n-butylglycidyl ether, phenylglycidyl ether, styrene oxide, cresylglycidyl ether and glycidyl esters of α-branched, saturated fatty acids as well as bifunctional thinners, such as butanediol diglycidyl ether, hexanediol diglycidyl ether and 1,4-bis(hydroxymethyl)cyclohexane diglycidyl ether. The use of monofunctional thinners should not exceed 20% by weight (based on the glycidyl ester), and the addition of bifunctional thinners can be up to 30% by weight, whereas the content of 1,4-bis(hydroxymethyl)cyclohexane diglycidyl ether can be up to 50%.

The varnishes of this invention can be applied, depending on the adjusted viscosity and the time and conditions of application, by processes known and conventional for the application of liquid varnishes, e.g. by spraying with single-component spraying systems or spraying systems, with or without a heater, in accordance with the compressed-air, airless or electrostatic methods or by rolling, pouring, dipping of manual application.

The viscosity of the varnishes can be extensively regulated, in addition to using the varnish recipe for this purpose, by the composition of the acidic esters. Thus, a molar percent ratio of the carboxylic acids recited under III.(a) and III.(b) of 25:75 to 50:50 makes it possible to produce especially low-viscosity glycidyl esters, and thus varnishes of low viscosity on this basis; this can also be attained by using long-chain aliphatic diols and dicarboxylic acids according to I.(b) and III.(a).

The glycidyl esters of this invention can furthermore be added as upgraders to other curable polyepoxide compounds, e.g. to the polyglycidyl ethers of bisphenol A; in the cured products thereof, the esters of this invention effect an increase in elasticity and a greater weathering resistance.

The baking conditions for the varnishes of this invention can be varied within wide limits; preferably, baking temperatures are employed of between 120° and 200° C.; the corresponding baking times are 30 and 5 minutes, respectively.

The hardness and elasticity of the coatings obtained from the coating compositions of this invention can be adapted almost in any desired way to the respective requirements by the composition of the acidic esters. The same measures which, as explained above, lead to particularly low-viscosity glycidyl esters also result in very elastic, especially impact-elastic coatings, as they are desirable, for instance, for the coating of metallic coil strips. The impact elasticity can be further raised, in particular, also by the use of cycloaliphatic diols according to I.(b), especially by using 1,4 -dihydroxymethylcyclohexane, wherein the hardness of the coatings is preserved. The use of branched diols, e.g. 2,2-dimethyl-1,3-propanediol, of a larger proportion of 85-75 molar percent of aromatic dicarboxylic acids, or the use of polycarboxylic acids with more than two carboxyl groups according to III.(b) results in increased corrosion protection, but this can also be attained by using an excess of 0.2–0.5 anhydride equivalents per epoxide equivalent of the curing agent. By the utilization of such measures, one skilled in the art can readily determine the optimum of coating properties for a specific coating problem.

Coatings produced with varnishes prepared from the coating compositions of this invention are distinguished by simultaneously attaining good mechanical properties, excellent weatherability and good corrosion protection. In this connection, the rquirements to be met by ecologically acceptable coating compositions are likewise fulfilled.

The varnish coating compositions of the present invention generally have a solvent content of less than 20%, preferably 3 - 10% and a viscosity of about 15-250 Sec. (Ford beaker, 4 mm, 20° C.), which allows industrial application between 20°-60° C. by common methods such as spraying, dipping, rolling or pouring.

The coating materials according to this invention are noted for their good wetting properties on many substrates, especially on metals, glass, etc. With appropriate formulations, such coating materials do not form runners even with little or no thixotropation, and good spreading is always maintained. Therefore, parts having edges, corners and cutouts or varying thickness can be coated uniformly with the coating materials according to this invention.

The good properties exhibited by the cured coatings of the present invention include:
Pendulum hardness according to DIN 53,157 of 100 -220 Sec., preferably 150-200 Sec.;
Pencil scratch hardness according to Wolff-Wilborn, 2H-8H, preferably 5H-8H;
Elasticity as Erichsen depression according to DIN 53,156 of 5-10 mm, preferably 7-10 mm;
Crisscross cut adhesion value according to DIN 53,151 of Gt 0 - Gt 2, preferably Gt 0 - 1;
Weatherability as 20% loss of gloss with Weather-Ometer of at least 800 hrs. on untreated deep-drawn steel sheets and at least 1,200-1,500 hrs. on pretreated steel sheets (phosphatization: Bonder 120).

The coatings obtained according to this invention are resistant to liquid aliphatic or aromatic hydrocarbons, alcohols, esters and ketones. Also, they are resistant to foodstuffs, such as tomato catsup, fresh or sour milk, lemon juice, oils or fats as well as to acids, such as 10% aqueous solutions of acetic acid, lactic acid, tartaric acid or citric acid. Coatings having contact with such foodstuffs or acids will not show any stains within 24 hrs.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following Examples, the temperatures are set forth uncorrected in degrees Celsius; unless otherwise indicated, all parts and percentages are by weight.

EXAMPLES (A) Preparation of the Acidic Esters

Ester A

A mixture of 99.3 parts of ethylene glycol, 576.0 parts of 1,4-dihydroxymethylcyclohexane (mixture of isomers with about 75% trans-proportion), 321.6 parts of 1,1,1-trimethylolpropane, 584.6 parts of adipic acid, and 1896 parts of phthalic anhydride is heated under an $N_2$-stream for 2 hours to 140° C. and then to 160° C., thus removing about 65 parts of water from the reaction mixture. The reaction is interrupted as soon as the ester has reached an acid number of about 277-280 mg. KOH/g. The cooled product has an acid number of 276 and an OH-number of 26 mg. KOH/g.

Ester B

A mixture of 99.3 parts of ethylene glycol, 576.0 parts of 1,4-dihydroxymethylcyclohexane (mixture of isomers with about 75% trans-proportion), 321.6 parts of 1,1,1-trimethylolpropane, 701.0 parts of adipic acid, and 1776 parts of phthalic anhydride is condensed as described in connection with ester A. The resultant ester has an acid number of 278 and an OH-number of about 27 mg. KOH/g.

Ester C

A mixture of 99.3 parts of ethylene glycol, 576.0 parts of 1,4-dihydroxymethylcyclohexane (mixture of isomers with about 75% trans-proportion), 321.6 parts of 1,1,1-trimethylolpropane, 807.5 parts of adipic acid, and 1654 parts phthalic acid anhydride is condensed as described with regard to ester A. The resultant ester has an acid number of 279 and an OH-number of about 25 mg. KOH/g.

Ester D

A mixture of 124.1 parts of ethylene glycol, 360.5 parts of 1,4-dihydroxymethylcyclohexane (mixture of isomers with about 75% trans-proportion), 67.1 parts of 1,1,1-trimethylolpropane, 365.4 parts of adipic acid, and 1110.9 parts of phthalic anhydride is condensed at 140°-160° C. until the ester has reached an acid number of 284 mg. KOH/g. The OH-number is about 20 mg. KOH/g.

Ester E

A mixture of 124.1 parts of ethylene glycol, 360.5 parts of 1,4-dihydroxymethylcyclohexane (mixture of isomers with about 75% trans-proportion), 67.1 parts of 1,1,1-trimethylolpropane, 584.6 parts of adipic acid, and 888.7 parts of phthalic anhydride is condensed at 140°-160° C. until an acid number of 286 mg. KOH/g. has been reached. The OH-number of the ester is about 25 mg. KOH/g.

Ester F

A mixture of 124.1 parts of ethylene glycol, 360.5 parts of 1,4-dihydroxymethylcyclohexane (mixture of isomers with about 75% trans-proportion), 67.1 parts of 1,1,1-trimethylolpropane, 730.0 parts of adipic acid, and 740.0 parts of phthalic anhydride is condensed as described in connection with ester E, yielding an acid having the acid number of 286 and an OH-number of about 17 mg. KOH/g.

Ester G

A mixture of 74.4 parts of ethylene glycol, 172.8 parts of 1,4-dihydroxymethylcyclohexane (mixture of isomers with about 75% trans-proportion), 214.4 parts of 1,1,1-trimethylolpropane, 233.6 parts of adipic acid, and 1108.8 parts of hexahydrophthalic anhydride is heated under an $N_2$-stream for 2 hours to 140° C. and then to 150° C., thus removing about 24 parts of water from the reaction mixture. The reaction is interrupted upon reaching an acid number of 280-284 mg. KOH/g. After cooling, the ester has an acid number of 279 and an OH-number of about 20 mg. KOH/g.

Ester H

A mixture of 74.4 parts of ethylene glycol, 172.8 parts of 1,4-dihydroxymethylcyclohexane (mixture of isomers with about 75% trans-proportion), 214.4 parts of 1,1,1-trimethylolpropane, 233.6 parts of adipic acid, and 1065.6 parts of phthalic anhydride is heated under an $N_2$-stream first for 2 hours to 140° C., then for 2 hours to 160° C., and finally to 180° C. until about 27 parts of water has been removed from the reaction mixture. The ester has an acid number of 288 and an OH-number of about 30 mg. KOH/g.

Ester I

A mixture of 111.7 parts of ethylene glycol, 121.7 parts of 1,2-propanediol, 81.7 parts of pentaerythritol, 409.2 parts of adipic acid, and 888.7 parts of phthalic anhydride is esterified under $N_2$ at 140° C., 2 hours at 160° C., and then at 180° C., thus driving off about 150 parts of water. The ester has an acid number of 317 and an OH-number of 13 mg. KOH/g.

Ester K

A mixture of 131.9 parts of ethylene glycol, 161.7 parts of 1,2-propanediol, 428.4 parts of 1,4-dihydroxymethylcyclohexane (mixture of isomers with about 75% trans-proportion), 173.6 parts of pentaerythritol, 993.8 parts of adipic acid, and 1726.5 parts of phthalic anhydride is condensed at 140°-160° C. until the ester has an acid number of 298 mg. KOH/g. The OH-number is about 16 mg. KOH/g.

Ester L

A mixture of 186.2 parts of ethylene glycol, 185.2 parts of 1,2-propanediol, 504.7 parts of 1,4-dihydroxymethylcyclohexane (mixture of isomers with about 75% trans-proportion), 136.1 parts of pentaerythritol, 1169 parts of adipic acid, and 1777 parts of phthalic anhydride is condensed as described with regard to ester K. The resultant ester has an acid number of 296 and an OH-number of about 19 mg. KOH/g.

Ester M

A mixture of 327.6 parts of 1,4-dihydroxymethylcyclohexane (mixture of isomers with 75% trans-proportion), 166.8 parts of pentaerythritol, 204.6 parts of adipic acid, and 1088.6 parts of phthalic anhydride is condensed at 140°-180° C. until the ester has reached an acid number of 274 mg. KOH/g. The OH-number is about 20 mg. KOH/g.

The following esters represent comparative examples:

Ester N

At 110° C., 230.2 parts of glycerol was added to 770 parts of hexahydrophthalic anhydride during the course of 10 minutes. The mixture was esterified at this temperature until the ester had an acid number of 281 mg. KOH/g. The OH-number was 134 mg. KOH/g.

Ester O

An esterification of 335 parts of 1,1,1-trimethylolpropane and 770 parts of hexahydrophthalic anhydride was conducted at 110°-120° C., resulting in an ester having an acid number of 251 and an OH-number of about 120 mg. KOH/g.

Ester P 155.2 parts of ethylene glycol and 770 parts of hexahydrophthalic anhydride were esterified at 100° C. until an acid number of 307 mg. KOH/g. had been attained. The OH-number of the ester was smaller than 10 mg. KOH/g.

Ester Q

At 120°-140° C., 155.2 parts of ethylene glycol and 740.6 parts of phthalic anhydride were esterified, yielding an ester with an acid number of 326 and an OH-number of about 20 mg. KOH/g.

Ester R

At 150°-200° C., 360 parts of 1,4-dihydroxymethylcyclohexane (mixture of isomers with about 75% trans-proportion) and 740.6 parts of phthalic anhydride were esterified; the ester had an acid number of 263 and an OH-number of about 13 mg. KOH/g.

(B) Preparation of the Glycidyl Esters

Glycidyl Ester GA 714.2 g. (3.51 carboxyl equivalents) of ester A is dissolved at 20°-70° C. in 3,249 g. of epichlorohydrin (35.1 moles). After the addition of 3.57 g. of tetraethylammonium bromide (0.5%, based on the ester), the mixture is rapidly heated to boiling (about 119°-123° C.). After a vigorous reflux has been obtained, 421.7 g. of 50% aqueous sodium hydroxide solution (50% excess) is added uniformly dropwise during the course of about 1.5 hours. The water introduced during this procedure and the water formed during the reaction is simultaneously removed azeotropically from the reaction mixture with the aid of epichlorohydrin, and the latter is recycled into the reaction flask after the water has been separated. During the addition of the sodium hydroxide solution, the temperature of the reaction mixture is not to drop below 102° C.; otherwise, the feeding speed of the sodium hydroxide solution is to be slowed down. Subsequently, the mixture is heated further for about 30-60 minutes to remove the last amounts of the water. In total, about 280 g. of water is separated. After cooling to room temperature, 100-200 g. of fuller's earth is added within 10 minutes, and the mixture is vigorously stirred for 30 minutes. Thereafter, the reaction mixture is filtered and the precipitate washed thoroughly with epichlorohydrin; the filtrates are combined. After removing the epichlorohydrin by distillation at 100-20 torr, the crude product is concentrated for 6-8 hours at 80° C. and 1 torr, yielding 885 g. (97% of theory) of glycidyl ester GA.

The properties of the glycidyl ester GA, as well as the glycidyl esters GB through GR, on the basis of esters B through R, can be seen from the following table. These glycidyl esters were obtained in accordance with the same process as glycidyl ester GA.

Epoxy number determination on glycidyl ester dissolved in chloroform was done by titration in glacial acetic acid in the presence of tetraethyl ammonium bromide (indicator: crystal violet; for details regarding determination please see DIN Draft 53,188). Hydroxide number was determined by quantitative IR Spectroscopy in tetrahydrofuran solution. Molecular weight (number average) was determined by vapor pressure osmosis in chlorobenzene. Chlorine content determination was done according to DIN Draft 53,744, Sh. 10, and viscosity determination according to DIN 53,015. Epoxide functionality (EF) of glycidyl esters was calculated by the following equation:

$$EF = \text{molecular weight} \times \text{epoxy number}/100$$

called pencil scratch hardness with the scratch hardness tester according to Wolff-Wilborn, on the other hand. The elasticity is measured according to DIN 53 156 (so-called Erichsen depression in mm., maximum value 10 mm.). The adhesion is tested by the crisscross cut charactersitic according to DIN 53,151. To make these

TABLE 1

Properties of the Glycidyl Esters

| Ester | Glycidyl Ester | Yield of Glycidyl Ester % of Th. | EN | OHN | Molecular Weight (Number Average) | EF | % Cl | Viscosity mPa.s (25° C.) |
|---|---|---|---|---|---|---|---|---|
| A | GA | 97 | 0.324 | 55 | 600 | 1.95 | 1.40 | 63,000 |
| B | GB | 95 | 0.307 | 60 | 640 | 1.96 | 1.17 | 94,000 |
| C | GC | 98 | 0.316 | 53 | 630 | 1.98 | 1.24 | 50,000 |
| D | GD | 92 | 0.305 | 60 | 580 | 1.77 | 1.15 | 54,000 |
| E | GE | 94 | 0.297 | 60 | 630 | 1.87 | 1.30 | 21,000 |
| F | GF | 96 | 0.306 | 64 | 600 | 1.84 | 1.25 | 11,000 |
| G | GG | 95 | 0.339 | 45 | 560 | 1.90 | 0.96 | 49,000 |
| H | GH | 96 | 0.292 | 64 | 750 | 2.19 | 1.51 | 400,000 |
| I | GI | 94 | 0.315 | 50 | 600 | 1.89 | 1.92 | 44,000 |
| K | GK | 99 | 0.306 | 51 | 650 | 1.98 | 1.31 | 48,000 |
| L | GL | 97 | 0.316 | 76 | 580 | 1.83 | 1.39 | 18,000 |
| M | GM | 89 | 0.304 | 49 | 800 | 2.43 | 1.78 | 1,900,000 |
| N | GN | 99 | 0.302 | 171 | 620 | 1.87 | 1.18 | 43,000 |
| O | GO | 90 | 0.326 | 130 | 620 | 2.02 | 0.72 | 550,000 |
| P | GP | 97 | 0.367 | 60 | 470 | 1.71 | 1.17 | 9,800 |
| Q | GQ | 100 | 0.305 | 90 | 500 | 1.53 | 1.91 | 120,000 |
| R | GR | 94 | 0.290 | 27 | 660 | 1.92 | 1.48 | >2,000,000 |

EN = Epoxy number (= epoxide equivalents/100 g.)
OHN = OH-Number (mg. KOH/g.)
EF = Epoxide functionality (= epoxide equivalents/mole)

(C) Preparation of the Varnishes and Coatings (a) Low-Solvent Varnishes

General Varnish Recipe

An approximately 80% solution of a glycidyl ester in xylene/ethyl glycol acetate (1 : 2) is combined, after adding 1% of a 10% solution of a flow agent on silicone resin basis in ethyl glycol acetate [based on the solid substance = binder (glycidyl ester + anhydride) + pigment], with a 25% excess of hexahydrophthalic anhydride and 75% (based on the binder) of aftertreated rutile as the pigment; the mixture is triturated on a one-roller mill. Under intensive agitation, 1% 2-ethylimidazole (based on the glycidyl ester), dissolved to form a 20% solution in ethyl glycol acetate, is added to the mixture 0.5 hour before application. The varnish is baked at 180° C. after application for 15 minutes.

As an example, the recipe of Example 1 will be set forth below:

| | | |
|---|---|---|
| 31.6 parts | of | glycidyl ester GA |
| 8.0 parts | | xylene/ethyl glycol acetate (1 : 2) |
| 38.4 parts | | rutile (aftertreated) |
| 197.7 parts | | hexahydrophthalic anhydride |
| 0.9 parts | | flow agent on silicone oil basis. 10%, in ethyl glycol acetate |
| 1.4 parts | | 2-ethylimidazole, 20% in ethyl glycol acetate/xylene (2 : 1) |
| 100.0 parts | | |

For testing purpose, the enamel is applied to deep-drawn steel sheets, normally having a thickness of 1 mm., and glass plates (thickness 5 mm.), which are degreased and have not been pretreated; then, the enamel is baked in. The baking conditions can be varied between 20 minutes at 140° C. and 10 minutes at 180° C., without there being any essential differences in the coating properties. The layer thickness of the films on which the test is conducted is normally 40–50 μ. The hardness is tested in accordance with DIN [German Industrial Standard] 53,157 (pendulum hardness in seconds), on the one hand, and by determining the so-called pencil scratch hardness with the scratch hardness tester according to Wolff-Wilborn, on the other hand. The elasticity is measured according to DIN 53 156 (so-called Erichsen depression in mm., maximum value 10 mm.). The adhesion is tested by the crisscross cut charactersitic according to DIN 53,151. To make these conditions even stricter, the two parallel groups of cut lines are arranged at an acute mutual angle of 45°; furthermore, a commercially available, transparent self-adhesive strip is glued over the cut lines and then suddenly torn off (measured values Gt 0 to Gt 4).

The examples and results listed in Table 2 were obtained analogously to the above general varnish recipe. The glycidyl esters of this invention (Examples 1–12) exhibit, as compared to the comparative examples (Examples 13–18), a markedly higher elasticity and, in most cases, also a clearly improved adhesion, with the same hardness.

Coatings on the basis of the glycidyl esters of this invention have a high weathering and water resistance, as well as good corrosion protection. Results to this effect with Examples 1–12 can be found in Table 3. All of the measurements were conducted on coatings on bright steel sheet. The weatherability was tested with a Weather-Ometer with xenon lamp, Type 60 W (company: Brabender) at a blackbody temperature of 45° C. with the 17/3 cycle (17 minutes of light exposure, 3 minutes of water spray). The examination was terminated upon a relative loss of luster of 20%.

The luster was determined under an angle of incidence of 45° according to Lange. Before beginning the light exposure, the luster value of the coatings was above 80%. The water resistance was determined under long-term exposure in accordance with the condensation water [damp heat] test (tropical test) according to SK DIN 50,017. The measurement was terminated as soon as an impairment of the varnish coat occurred, for example by blister formation, softening. The stability of the varnish films in an industrial climate was determined by the Kesternich test SFW 2.0 S DIN 50,018. The corrosion protection was tested according to the salt-spray test ASTM B-117-64.

TABLE 2

Mechanical Properties of Glycidyl Ester Coatings

| Ex. No. | Glycidyl Ester | Pendulum Hardness seconds | Scratch Hardness | Erichsen Depression mm. | Crisscross Cut Characteristic |
|---|---|---|---|---|---|
| 1 | GA | 193 | 8 H | 9.3 | Gt 1 |
| 2 | GB | 181 | 7 H | 8.6 | Gt 0 |
| 3 | GC | 180 | 8 H | 8.4 | Gt 0 |
| 4 | GD | 176 | 8 H | 9.1 | Gt 0 |
| 5 | GE | 156 | 5 H | 9.4 | Gt 0 |
| 6 | GF | 134 | 6 H | 9.4 | Gt 0 |
| 7 | GG | 186 | 8 H | 8.8 | Gt 1 |
| 8 | GH | 200 | 8 H | 7.0 | Gt 1 |
| 9 | GI | 184 | 8 H | 8.8 | Gt 1 |
| 10 | GK | 180 | 6 H | 9.8 | Gt 0 |
| 11 | GL | 177 | 8 H | 9.0 | Gt 0 |
| 12 | GM | 202 | 7 H | 6.1 | Gt 1 – Gt 2 |
| 13 | GN | 186 | 8 H | 0.5 | Gt 3 – Gt 4 |
| 14 | GO | 193 | 8 H | 0.6 | Gt 3 |
| 15 | GP | 184 | 8 H | 1.2 | Gt 0 |
| 16 | GQ | 197 | 8 H | 0.5 | Gt 3 – Gt 4 |
| 17 | GR | 197 | 8 H | 1.5 | Gt 3 |
| 18 | Bisphenol A[(1)]-Bisglycidyl Ether | 208 | 7 H | 3.8 | Gt 1 |

Baking Conditions: 15 minutes at 180° C.
[(1)]"Epikote" 828 (Shell AG.), EN = 0.52. To improve elasticity, only 0.9 anhydride equivalents were used per epoxide equivalent in Example 18.

TABLE 3

Weathering Resistance and Corrosion Protection of Glycidyl Ester Coatings

| Ex. No. | Glycidyl Ester | Weather-Ometer Test hours | Tropical Test days | Kesternich Test rounds | Salt-Spray Test hours |
|---|---|---|---|---|---|
| 1 | GA | 1,300 | 50 | 16 | 530 |
| 2 | GB | 1,000 | 25 | 5 | 450 |
| 3 | GC | 1,100 | 10 | 5 | 300 |
| 4 | GD | 1,100 | 20 | 13 | 450 |
| 5 | GE | 1,000 | 10 | 6 | 350 |
| 6 | GF | 1,000 | 10 | 5 | 200 |
| 7 | GG | 1,200 | >50 | 8 | 500 – 850[(1)] |
| 8 | GH | 1,000 | 30 | 10 | 800 |
| 9 | GI | 1,100 | 30 | 9 | 250 – 350[(1)] |
| 10 | GK | 850 – 1,000[(1)] | 20 | 7 | 700[(4)] |
| 11 | GL | 1,100 | 10 | 3 | 300 |
| 12 | GM | >1,000[(2)] | >50 | 8 – 13[(1)] | 600 – >1,000[(1)] |
| 18 | "Epikote" | 100 – 350[(1)(3)] | >50 | >20 | 400 – 800[(1)] |

Baking Conditions: between 20 minutes at 140° C. and 10 minutes at 180° C.
[(1)]Upper and lower measured values in several measurements.
[(2)]Loss of luster at 1000 hours 1–2%.
[(3)]In contrast to Examples 1–12, yellowing of the surface occurred in Example 18.
[(4)]Per epoxide equivalent, 1.5 anhydride equivalents were employed. At a lower excess of anhydride, a lower measured value was obtained.

The viscosities of the varnishes according to the general varnish recipe range at about 100-400 seconds efflux time in a Ford beaker (4 mm. nozzle, 20° C.). Accordingly, they can be applied at room temperature or slightly elevated temperature according to the rolling process, at temperatures starting with about 30-50° C. according to the spraying method. Varnishes of a lower viscosity are obtained by the use of methylhexahydrophthalic anhydride as well as of anhydride mixtures. The viscosity can furthermore be favorably affected by the amount of pigment, the quantity of anhydride, as well as by customary varnish adjuvants.

(b) Solvent-Free Varnishes

The concomitant use of reactive epoxy resin thinners makes it possible to produce solvent-free varnishes, i.e. varnishes which are especially ecologically valuable and which can be applied by the spraying method even at room temperature or slightly elevated temperature. From a plurality of possible combinations, the following example has been selected.

| 14.1 parts | of glycidyl ester GG |
|---|---|
| 8.5 parts | 1,4-bis(hydroxymethyl)cyclohexane bis-glycidyl ether (EN ≈ 0.6) |
| 5.6 parts | n-butylglycidyl ether |
| 42.4 parts | rutile, aftertreated |
| 28.5 parts | methylhexahydrophthalic anhydride |
| 0.8 parts | 2-ethylimidazole (100%) |
| 0.1 parts | flow agent on silicone oil basis |
| 100.0 parts | |

The varnish has, at room temperature, a spray varnish viscosity (about 35–50 seconds in a Ford 4-mm. beaker). The catalyst is added only prior to application.

The preceding examples can be repeated with similar success by substituting the generically and specifically described reactants and/or operating conditions of this invention for those used in the preceding examples.

From the foregoind description, one skilled in the art can easily ascertain the essential characteristics of this invention, and without departing from the spirit and scope thereof, can make various changes and modifications of the invention to adapt it to various usages and conditions.

What is claimed is:

1. In an epoxy resin-based liquid varnish coating composition whose binder comprises one or more cyclic anhydrides of saturated and/or unsaturated aliphatic and/or cycloaliphatic dicarboxylic acids, or a mixture consisting essentially of carboxylic acid anhydrides of saturated and/or unsaturated aliphatic and/or cycloaliphatic and aromatic dicarboxylic acids, wherein the melting point of the anhydride or anhydride mixture is below 100° C., the improvement wherein the coating composition contains at most up to 25% volatile solvent, the binder is a mixture of A) glycidyl esters and B) one or more of said anhydrides, in a ratio such that the binder contains 0.7 – 1.5 anhydride equivalents per epoxide equivalent of glycidyl ester, wherein the glycidyl esters have 1.5 – 2.5 epoxide equivalents/mole, an epoxy number of 0.2 – 0.4 epoxide equivalents/100 g., a hydroxyl number of 20-130 mg. KOH/g. and a number average molecular weight of 450-800, and are prepared by glycidylating an esterification product containing free carboxyl groups with a molar excess of a 2,3-epoxyhaloalkane in the presence of an agent which splits off hydrogen halide, said esterification product having an acid number 220-350 mg. KOH/g., a hydroxyl number of 0-100 mg. KOH/g., an average molecular weight of 350–600 and an average degree of polymerization of 2.8 – 3.5 and wherein the esterification product is prepared by condensing a reaction mixture consisting essentially of:

(a) 100-50 molar percent of at least one aliphatic or cycloaliphatic diol wherein the hydroxyl functions are separated from each other by 2-12 carbon atoms and 0-2 of said carbon atoms are substituted by an oxygen atom which oxygen atoms when present are separated by at least 2 carbon atoms from each other and from the hydroxyl groups, and correspondingly 0-50 molar percent of at least one aliphatic polyol of 3-6 carbon atoms and 3 and 4 hydroxyl groups; and (b) a mixture of 15-50 molar percent of at least one saturated aliphatic dicarboxylic acid of 4–12 carbon atoms or an intramolecular anhydride thereof, and correspondingly 85-50 molar percent of at least one aromatic or cycloaliphatic dicarboxylic acid other than terephthalic acid of 6-12 ring carbon atoms or an intramolecular anhydride thereof, or a corresponding mixture thereof and up to 30 molar percent of an aromatic polycarboxylic acid having 3 or more carboxyl groups or an intrmolecular anhydride thereof.

2. A composition according to claim 1 wherein (a) consists essentially of said diol.

3. A composition according to claim 1 wherein (a) includes 5-50 molar percent of said aliphatic polyol.

4. A composition according to claim 1 wherein (b) consists essentially of said saturated aliphatic dicarboxylic acid and said aromatic or cycloaliphatic dicarboxylic acid.

5. A composition according to claim 1 wherein (b) contains 5-30 molar percent of said aromatic polycarboxylic acid of 3 or more carboxyl groups or an intramolecular anhydride thereof.

6. A composition according to claim 1 wherein said glycidyl ester contains 1.7 – 2.1 epoxide equivalents/mole and has an epoxy number of 0.25–0.36 epoxide equivalents/100 g., a hydroxyl number of 30 – 80 mg. KOH/g. and a molar mass of 500–700.

7. A composition according to claim 1 wherein A) is a cyclic anhydride of a cycloaliphatic carboxylic acid.

8. A composition according to claim 1 containing 3–10% volatile solvent and wherein B) is hexahydrophthalic anhydride.

9. A composition according to claim 1 wherein the 2,3-epoxyhaloalkane employed to produce the glycidyl esters is epichlorohydrin.

10. A composition according to claim 1 wherein (b) is a mixture of adipic acid and phthalic or hexahydrophthalic anhydride and wherein the diol of (a) is one or more of ethylene glycol and 1,2-propanediol and 1,4-bis(hydroxymethyl)cyclohexane and the polyol of (a) is one or more of 1,1,1-trimethylolpropane, glycerol and pentaerythritol.

11. A composition according to claim 1 containing 3-10% volatile solvent and wherein B) is hexahydrophthalic anhydride, wherein the 2,3-epoxyhaloalkane employed to produce the glycidyl esters is epichlorohydrin, wherein (b) is a mixture of adipic acid and phthalic or hexahydrophthalic anhydride and wherein the diol of (a) is one or more of ethylene glycol and 1,2-propane diol and 1,4-bis(hydroxymethyl)cyclohexane and the polyol of (a) is one or more of 1,1,1-trimethylolpropane, glycerol and pentaerythritol.

* * * * *